(12) United States Patent
Janssen et al.

(10) Patent No.: US 6,619,802 B2
(45) Date of Patent: Sep. 16, 2003

(54) MULTI-STRIPE SCROLLING FOR COLOR PROJECTION

(75) Inventors: Peter J. Janssen, Scarborough, NY (US); Jeffrey A. Shimizu, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/028,407

(22) Filed: Dec. 21, 2001

(65) Prior Publication Data

US 2003/0117592 A1 Jun. 26, 2003

(51) Int. Cl.[7] .................. G03B 21/00; G03B 21/14; G03B 21/26; F21V 9/00; G02B 26/08
(52) U.S. Cl. ..................... 353/31; 353/33; 353/37; 353/94; 353/98; 353/122; 349/5; 362/293; 359/196; 359/216
(58) Field of Search ...................... 353/30, 31, 33, 353/34, 37, 76, 77, 78, 94, 101, 122, 98; 349/5; 362/293; 359/196, 200, 202, 205, 210, 211, 218, 221, 226, 256, 259, 460, 216

(56) References Cited

U.S. PATENT DOCUMENTS

| 5,971,547 A | * 10/1999 | Reilley ............... 353/122 |
| 6,266,105 B1 | 7/2001 | Gleckman ............. 348/743 |
| 6,454,440 B2 | * 9/2002 | Yamamoto ............ 362/293 |
| 6,511,186 B1 | * 1/2003 | Burstyn et al. ........... 353/76 |

* cited by examiner

Primary Examiner—Russell Adams
Assistant Examiner—Melissa J Koval
(74) Attorney, Agent, or Firm—Eric M. Bram

(57) ABSTRACT

A multi-stripe scrolling apparatus has a beam splitter (13) that internally reflects white light onto a movable array of holographic elements (30, 32, 34) that respectively emit three different color beams that are focused onto a light valve (36), causing bands of the three colors to sequentially scroll across the light valve (36).

22 Claims, 4 Drawing Sheets

MULTI-STRIPE SCROLLING FOR COLOR PROJECTION

FIELD OF THE INVENTION

The invention relates to color projection systems, and more particularly to projection systems incorporating a single electro-optical light modulator.

BACKGROUND AND SUMMARY OF THE INVENTION

Color projection display systems exist in which a white light source is separated into red, blue, and green sub-beams for separate modulation by corresponding color components of an incoming display signal, and then the modulated subbeams are recombined into a full color display for projection onto a viewing screen. Modulation of the subbeams is commonly carried out using three separate electro-optical light modulators such as liquid crystal display (LCD) panels, one for each of the three subbeams.

However, in one type of color projection system the three subbeams are all modulated by a single LCD panel. This is accomplished by shaping the subbeams into band-shaped cross-sections, and scrolling the bands sequentially across the LCD panel (also referred to as a light valve), while synchronously addressing those portions of the panel that are illuminated by the bands with the corresponding display signal information. The simultaneous use of a substantial portion of the available red, blue and green light through a single light valve panel provides optical efficiencies comparable to that of three-panel systems employing the same types of light-valve panels. Using only a single panel eliminates the need to mechanically converge different color images, formed on different panels, and reduces system cost.

A compact apparatus for generating a scrolling color stripe pattern is taught by Gleckman in U.S. Pat. No. 6,266,105 for example. Gleckman's apparatus employs a drum covered with dichroic elements that selectively reflect red, green and blue color bands. The reflected light is separated from the incoming light by means of a polarizing beam-splitter and quarter wave plate. Unfortunately however, neither the dichroics nor the optics can be produced at low cost.

Our new invention does not use expensive elements and does not rely on polarized light. It is based on low-cost technology and can also be used with light valves that don't use polarized light, e.g. tilting mirror array or DMD. Generally, multistripe scrolling according to the invention includes using holographic elements to isolate light beams of three colors, e.g., red, green, and blue, from white light, and causing them to scroll sequentially across a light valve.

In one aspect of the invention, a multi-stripe scrolling apparatus comprises a white light source; a lens system including a total internal reflection beam splitter having an internal surface exhibiting a critical angle of total internal reflection; a movable array of holographic elements including a plurality of first holographic elements for producing a first color, a plurality of second holographic elements for producing a second color substantially different from the first color, and a plurality of third holographic elements for producing a third color substantially different from the first and second colors; and a light valve. Each of the first, second, and third holographic elements is configured such that white light arriving at a respective one of the first, second, and third holographic elements from a respective arrival direction produces a beam of substantially monocolor light of a respective one of the first, second, and third colors, that leaves the respective one of the first, second, and third holographic elements in a respective departure direction that differs by a predetermined angle from the respective arrival direction. The predetermined angle is the same for the first holographic elements as for the second and third holographic elements. The white light source, lens system including beam splitter, movable array, and light valve are physically disposed relative to one another such that light from the white light source enters the beam splitter and impinges at a angle of incidence to the internal surface that is greater than the critical angle, so that the light from the white light source is reflected from the internal surface and is directed to the respective ones of the first, second, and third holographic elements, and such that the a beams of substantially monocolor light leaving respective first, second, and third holographic elements reach the beam splitter and impinge at a second angle of incidence to the internal surface that is less than the critical angle, so that the beams of first, second, and third color light pass through the internal surface to form alternating bands of light of the first, second, and third colors that scroll across the surface of the light valve when the movable array is moving.

In another aspect of the invention, a multi-stripe scrolling apparatus comprises a white light source; a total internal reflection-beam splitter disposed to internally reflect light from the white light source; a movable array of holographic elements including a plurality of first color-emitting holographic elements, second color-emitting holographic elements, and third color-emitting holographic elements alternatingly arranged and disposed to receive the light internally reflected by the beam splitter, and to emit first, second, and third color light beams that are not internally reflected but pass through the beam splitter, the first, second, and third colors being substantially different colors from one another; and a light valve disposed to receive the first, second, and third color light beams that have passed through the beam splitter.

In yet another aspect of the invention, a multi-stripe scrolling apparatus comprises a light valve; means for generating light; holographic element means for receiving the light and producing therefrom first, second, and third color light beams of respectively different colors; and means for internally reflecting the light off an internal surface, for directing the reflected light to the holographic element means, for transmitting the first, second, and third color light beams through the internal surface, and for directing the first, second, and third color light beams onto the light valve to form alternating bands of light of the first, second, and third colors across the surface of the light valve.

In still another aspect of the invention, a method of causing alternating bands of first, second, and third color light to scroll-across the surface of a light valve, comprises reflecting a collimated beam of light off an internal surface of a total internal reflection beam splitter; directing the reflected light onto an array of holographic elements including at least a first, a second, and a third holographic element; emitting a first color light beam from the first holographic element; emitting a second color light beam from the second holographic element, the second color being substantially different from the first color; emitting a third color light beam from the third holographic element, the third color being substantially different from both of the first and second colors; transmitting the first, second, and third color light beams through the internal surface of the beam splitter; directing the first, second, and third color light beams transmitted through the internal surface to form alternating bands of light of the first color, the second color, and third color, respectively, on the light valve; and moving the array of holographic elements so that the alternating bands of first, second, and third color light scroll across the surface of the light valve.

BRIEF DESCRIPTION OF THE DRAWING FIGURES

The various features of the invention can be better understood with reference to the figures of the drawing, in which.

DETAILED DESCRIPTION

Figure 1:
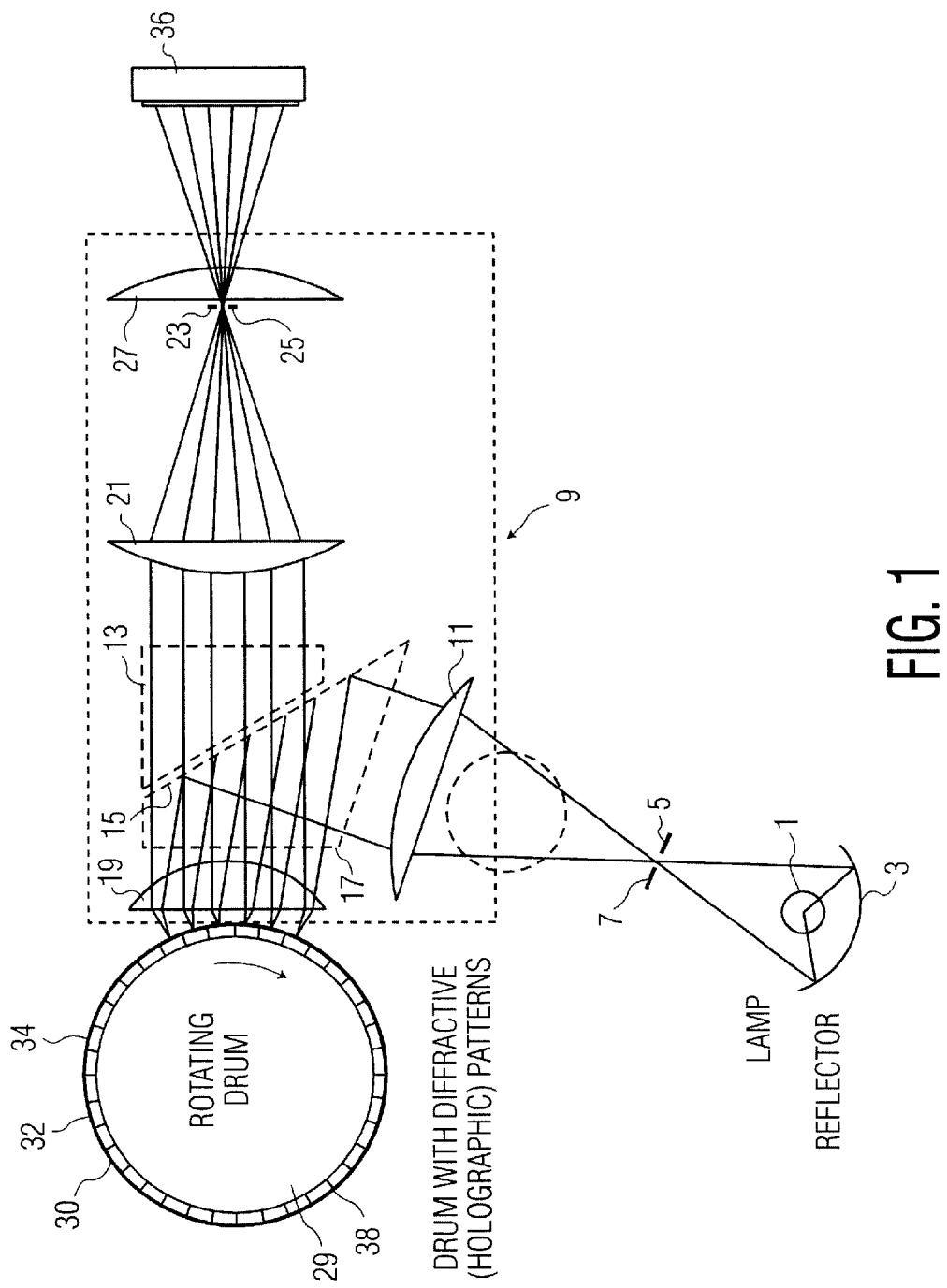
FIG. 1 is a cross-sectional view of one possible embodiment of multi-stripe color scrolling according to the invention.

FIG. 1 illustrates multistripe scrolling color according to one possible embodiment of the invention. A lamp includes a white light source 1, in this embodiment an incandescent bulb 1, a mirror 3, and a source mask 5 having a source aperture 7. A lens system 9 includes a collimating lens 11, a Total Internal Reflection (TIR) beam splitter 13 having an internal surface 15 and an exit surface 17, a converging lens 19, a focusing lens 21, an exit mask 23 having an exit aperture 25, and a correcting lens 27. A movable array 29 of diffractive, i.e. holographic elements includes a rotatable drum 29 having repeating sequences of first, second, and third color (e.g., red, green, and blue) emitting holographic elements 30, 32, 34. A light valve 36 includes a single liquid crystal display (LCD) panel 36.

In operation, a beam of collimated white light from the white light source 1 is directed into the light valve 36. It should be noted that for the purposes of this application "white light source" and in general "white light" signifies any multi-wavelength light that includes a range of wavelengths broad enough (in difference between smallest and largest wavelength) to encompass a sizable portion of the visible light range, and preferably including red, green, and blue wavelengths. Therefore a fluorescent or other tri-wavelength light source including exactly three wavelengths (red, green, and blue for example), a high-intensity incandescent bulb, and even an ordinary household lightbulb would qualify as a "white light source."

White light from the white light source (1) is reflected and focused by the mirror 3 through the source aperture 7 in the source mask 5. Converging after passing through the source aperture 7, the white light is collimated by the collimating lens 11 and enters the lens system 9.

In the lens system 9, the collimated white light enters the TIR beam splitter 13 and impinges on the internal surface 15 of the TIR beam splitter 13. The internal surface 15 has a critical angle α for internal reflection. This angle is measured relative to the normal (perpendicular) of the internal surface 15. The angular deviation from the normal to the internal surface 15 of light impinging on the internal surface 15 is called its angle of incidence. Light having an angle of incidence with the internal surface 15 no greater than the critical angle α will mostly pass through the internal surface 15. Light having an angle of incidence greater than the critical angle α will be totally reflected. This is known as total internal reflection, or TIR.

Figure 2:
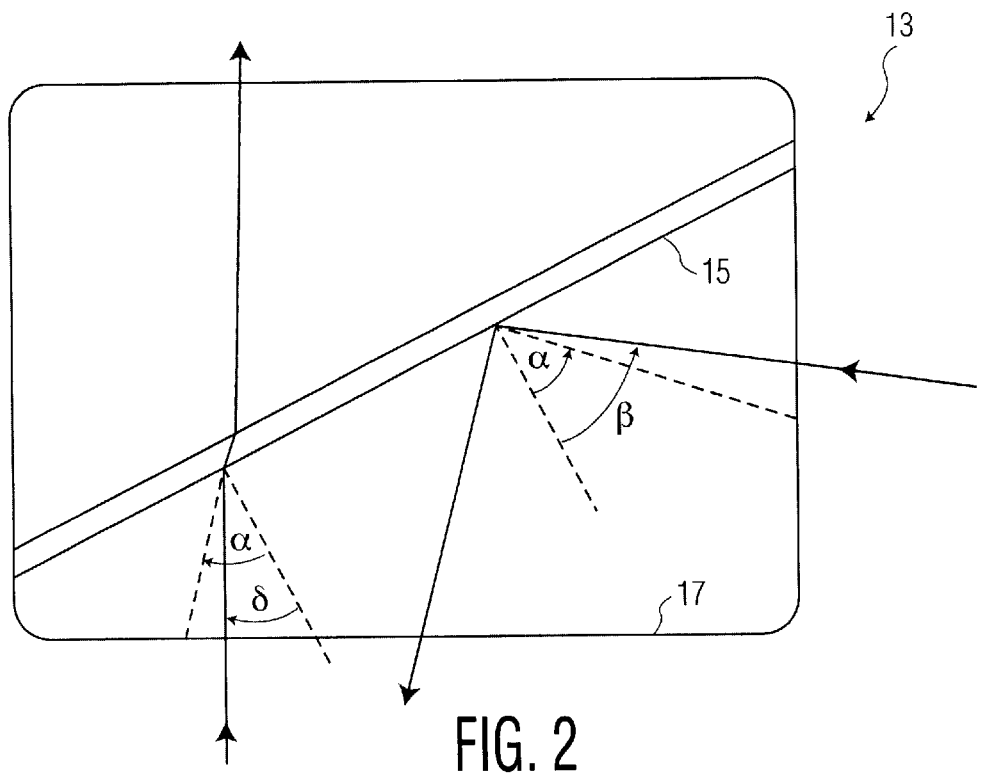
FIG. 2 is a cross-sectional view of a total internal reflection beam splitter according to the embodiment of FIG. 1.
Figure 3:
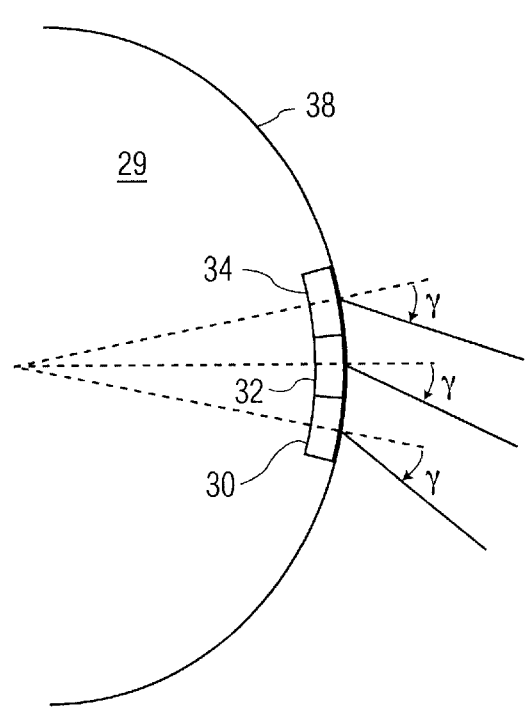
FIG. 3 is a cross-sectional view of a portion of a rotatable drum showing three sample holographic elements disposed on its circumference.

As can be seen more clearly in FIG. 2, the collimated white light has an angle of incidence β with the internal surface 15 that is greater than the critical angle α, and so is totally reflected. Light then exits the beam splitter 13 through the exit surface 17 (at an angle of incidence less than the critical angle α), passes through the converging lens 19, and-strikes the holographic elements 30, 32, 34 of the rotatable drum 29. As can be seen in FIGS. 1 and 3, the converging lens 19 causes the collimated light to converge somewhat so that it has the same angle of incidence γ at different holographic elements 30, 32, 34 around the circumference 38 of the drum 29.

The different types of holographic elements 30, 32, 34 have correspondingly different colors of interest. For example, red for first holographic elements 30, green for second holographic elements 32, and blue for third holographic elements 34. Each holographic element is configured so that if white light enters at the angle of incidence γ, its respective color of interest is emitted at an angle that is the same for all the holographic elements 30, 32, 34. For example, in the embodiment shown in FIG. 3, white light enters each of the first holographic elements 30, second holographic elements 32, and third holographic elements 34 at the angle of-incidence γ, and beams of red, green, and blue light all exit the first holographic elements 30, second holographic elements 32, and third holographic elements 34, respectively, at a direction directly radially from the center of the drum 29 (in this particular embodiment).

These red, green, and blue colored beams pass through the converging lens 19, which re-collimates them, and they once again pass into the beam splitter 13. However, this time when they reach the internal surface 15 they are at an angle of incidence δ less than the critical angle α, so they pass through the internal surface 15 of the beam splitter 13. The focusing lens 21 focuses the beams through the exit aperture 25 in the exit mask 23. The beams pass through the correcting lens 27, and onto the light valve 36 in a pattern of corresponding red, green, and blue bands on the surface of the light valve 36. It will be understood that as the rotatable drum 29 rotates, these bands will be caused to scroll across the surface of the light valve 36.

Figure 4B:
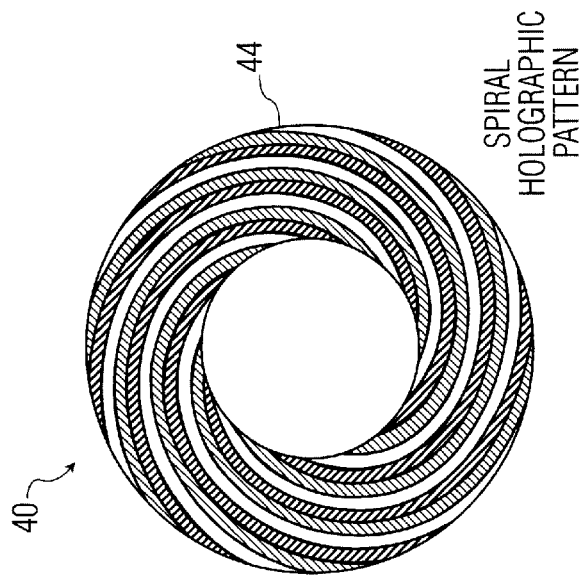
FIG. 4 is a cross-sectional view of a second possible embodiment of multi-stripe color scrolling according to the invention.
Figure 4A:
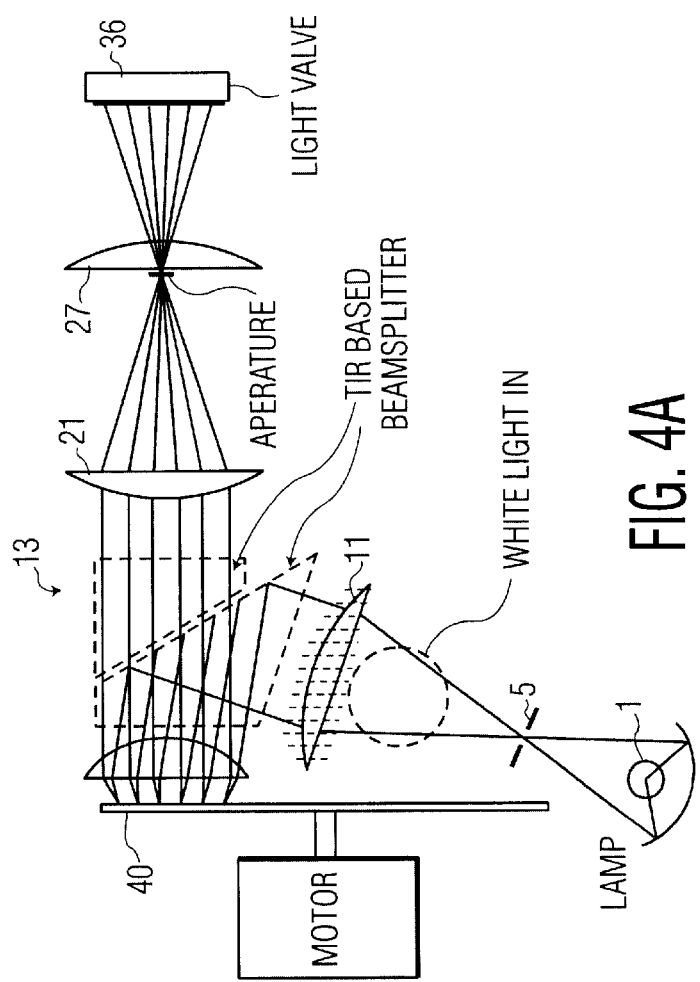
Figure 5:
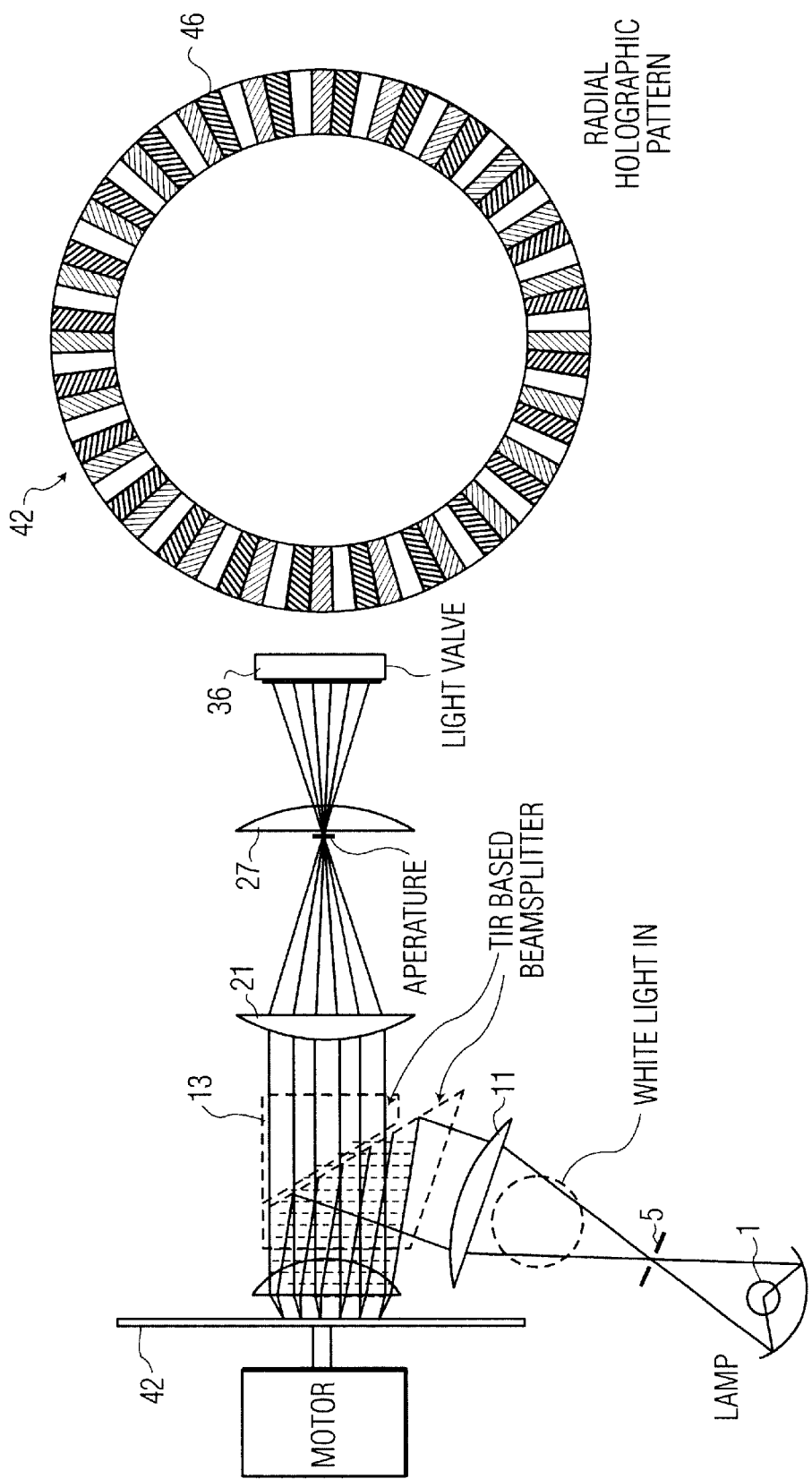
FIG. 5 is a cross-sectional view of a third possible embodiment of multi-stripe color scrolling according to the invention.

Many different variations of the invention or possible. For example, many arrangements can be envisioned for causing the holographic elements 30, 32, 34 to cycle across the white light field, and thus cause the colored beams they produce to scroll across light valve 36. For example, rotating disks 40, 42 with spiral 44 (FIG. 4), radial 46 (FIG. 5), or other patterns of holographic elements can be used. Or, a revolving belt or other means may be used to sequence the holographic elements across the white light field. Also, different variations of lens systems can be envisioned. In some embodiments the correcting lens 27 (and/or other elements of the lens system) may not be necessary.

Other embodiments, variations of embodiments, and equivalents, as well as other aspects, objects, and advantages of the invention, will be apparent to those skilled in the art and can be obtained from a study of the drawings, the disclosure, and the appended claims.

What is claimed is:

1. A multi-stripe scrolling apparatus comprising:
   a white light source;
   a lens system including a total internal reflection beam splitter having an internal surface exhibiting a critical angle of total internal reflection;
   a movable array of holographic elements including a plurality of first holographic elements for producing a first color, a plurality of second holographic elements for producing a second color substantially different from the first color, and a plurality of third holographic elements for producing a third color substantially different from the first and second colors; and
   a light valve,
   each of the first, second, and third holographic elements being configured such that white light arriving at a respective one of the first, second, and third holographic elements from a respective arrival direction produces a beam of substantially monocolor light of a respective one of the first, second, and third colors, that leaves said respective one of the first, second, and third holographic elements in a respective departure direction that differs by a predetermined angle from the respective arrival direction, the predetermined angle being the same for the first holographic elements as for the second and third holographic elements,
   the white light source, lens system including beam splitter, movable array, and light valve being physically disposed relative to one another such that:
      light from the white light source enters the beam splitter and impinges at a first angle of incidence to the internal surface that is greater than the critical angle, so that the light from the white light source is reflected from the internal surface and is directed to the respective ones of the first, second, and third holographic elements; and
      said beams of substantially monocolor light leaving respective first, second, and third holographic elements reach the beam splitter and impinge at a second angle of incidence to the internal surface that is less than the critical angle, so that said beams of first, second, and third color light are not reflected from but pass through the internal surface to form alternating bands of light of the first, second, and third colors that scroll across the surface of the light valve when the movable array is moving.

2. The apparatus recited in claim 1, the lens system further including a collimating lens disposed between the white light source and the beam splitter to collimate the light from the white light source as it passes to the beam splitter.

3. The apparatus recited in claim 1, wherein the movable array of holographic elements is comprised by a rotatable drum having a plurality of said first, second, and third holographic elements disposed around the circumference of the drum.

4. The apparatus recited in claim 3, the lens system further including a converging lens disposed between the beam splitter and the drum to cause the white light reflected from the internal surface of the beam splitter to arrive at each holographic element at a substantially constant angle relative to said holographic element as the drum rotates and said holographic element revolves along an arc of the circumference of the drum illuminated by the white light, and to collimate said beams of first, second, and third color light that leave the respective first, second, and third holographic elements before said beams of first, second, and third color light enter the beam splitter.

5. The apparatus recited in claim 1, wherein the movable array of holographic elements is comprised by a rotatable disk having holographic stripes in a radial pattern on a surface of the disk.

6. The apparatus recited in claim 1, further comprising an exit mask having an aperture therein disposed between the beam splitter and the light valve,
   the lens system further including a focusing lens, disposed between the beam splitter and the exit mask, that focuses said beams of first, second, and third color light that have passed through the internal surface into the aperture.

7. A multi-stripe scrolling apparatus comprising:
   a white light source;
   a total internal reflection beam splitter disposed to internally reflect light from the white light source;
   a movable array of holographic elements including a plurality of first color-emitting holographic elements, second color-emitting holographic elements, and third color-emitting holographic elements alternatingly arranged and disposed to receive the light internally reflected by the beam splitter, and to emit first, second, and third color light beams that are not internally reflected but pass through the beam splitter, said first, second, and third colors being substantially different colors from one another; and
   a light valve disposed to receive said first, second, and third color light beams that have passed through the beam splitter.

8. The apparatus recited in claim 7, further comprising a collimating lens disposed between the white light source and the beam splitter.

9. The apparatus recited in claim 7, wherein the movable array of holographic elements is comprised by a rotatable drum having a plurality of said first, second, and third holographic elements disposed around the circumference of the drum.

10. The apparatus recited in claim 9, further comprising a converging lens disposed between the beam splitter and the drum.

11. The apparatus recited in claim 7, wherein the movable array of holographic elements is comprised by a rotatable disk having holographic stripes in a radial pattern on a surface of the disk.

12. The apparatus recited in claim 10, further comprising:
   an exit mask having an aperture therein disposed between the beam splitter and the light valve; and
   a focusing lens disposed between the beam splitter and the exit mask.

13. A multi-stripe scrolling apparatus comprising:
   a light valve;
   means for generating light;
   holographic element means for receiving the light and producing therefrom first, second, and third color light beams of respectively different colors; and
   means for internally reflecting the light off an internal surface, for directing said reflected light to the holographic element means, for transmitting the first, second, and third color light beams through the internal surface, and for directing the first, second, and third color light beams onto the light valve to form alternating bands of light of the first, second, and third colors across the surface of the light valve.

14. The apparatus recited in claim 13, further comprising means for moving the holographic element means to make the alternating bands of light of the first, second, and third colors scroll across the surface of the light valve.

15. The apparatus recited in claim 14, wherein the holographic element means comprises a rotatable drum having a plurality of holographic elements disposed around the circumference of the drum.

16. The apparatus recited in claim 14, wherein the holographic element means comprises a rotatable disk having holographic stripes in a radial pattern on a surface of the disk.

17. A method of causing alternating bands of first, second, and third color light to scroll across the surface of a light valve, comprising:

reflecting a collimated beam of light off an internal surface of a total internal reflection beam splitter;

directing said reflected light onto an array of holographic elements including at least a first, a second, and a third holographic element;

emitting a first color light beam from the first holographic element;

emitting a second color light beam from the second holographic element, the second color being substantially different from the first color;

emitting a third color light beam from the third holographic element, the third color being substantially different from both of the first and second colors;

transmitting the first, second, and third color light beams through the internal surface of the beam splitter;

directing the first, second, and third color light beams transmitted through the internal surface to form alternating bands of light of the first color, the second color, and third color, respectively, on the light valve; and moving the array of holographic elements so that the alternating bands of first, second, and third color light scroll across the surface of the light valve.

18. The method recited in claim 17, further comprising constructing the array of holographic elements by arranging the first, second, and third holographic elements around the circumference of a rotatable drum, and wherein the step of moving the array of holographic elements includes rotating the drum.

19. The method recited in claim 18, wherein the step of arranging the first, second, and third holographic elements around the circumference of the rotatable drum includes arranging a plurality of the first holographic elements, a plurality of the second holographic elements, and a plurality of the third holographic elements, around the circumference of the rotatable drum in an alternating pattern of first, second, and third holographic elements, respectively.

20. The method recited in claim 17, further comprising constructing the array of holographic elements by arranging an alternating series of holographic stripes in a radial pattern on a surface of a disk, and wherein the step of moving the array of holographic elements includes rotating the disk.

21. The method recited in claim 17, further comprising forming the collimated beam of light by focusing light from a white light source to converge through an aperture of a source mask, and then collimating the light that has passed through the aperture of the source mask.

22. The method recited in claim 17, wherein the step of forming the alternating bands of first, second, and third color light on the light valve includes focusing the first, second, and third color light beams to converge through an aperture of an exit mask.

\* \* \* \* \*